US008874310B2

United States Patent
Baehrle-Miller et al.

(10) Patent No.: US 8,874,310 B2
(45) Date of Patent: Oct. 28, 2014

(54) METHOD FOR SECURING AN ELECTRICALLY OPERATED PARKING BRAKE

(75) Inventors: Frank Baehrle-Miller, Schoenaich (DE); Oliver Leibfried, Siegelsbach (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/814,857

(22) PCT Filed: Jun. 28, 2011

(86) PCT No.: PCT/EP2011/060767
§ 371 (c)(1),
(2), (4) Date: Apr. 10, 2013

(87) PCT Pub. No.: WO2012/019821
PCT Pub. Date: Feb. 16, 2012

(65) Prior Publication Data
US 2013/0190970 A1    Jul. 25, 2013

(30) Foreign Application Priority Data

Aug. 11, 2010  (DE) .................. 10 2010 039 183

(51) Int. Cl.
*G06F 11/30* (2006.01)
*G07C 5/00* (2006.01)
*B60T 1/00* (2006.01)
*B60T 17/22* (2006.01)
*B60T 7/12* (2006.01)
*B60T 13/74* (2006.01)

(52) U.S. Cl.
CPC ............ *B60T 17/22* (2013.01); *B60T 2201/06* (2013.01); *B60T 1/005* (2013.01); *B60T 7/122* (2013.01); *B60T 13/746* (2013.01)
USPC ........................................ 701/34.4

(58) Field of Classification Search
CPC ....... B60T 1/005; B60T 7/122; B60T 13/746; B60T 17/22; B60T 2201/06
USPC ........................................ 701/34.4
See application file for complete search history.

(56) References Cited

U.S. PATENT DOCUMENTS

| | | | | |
|---|---|---|---|---|
| 6,382,741 | B1 * | 5/2002 | McCann et al. | 303/191 |
| 6,406,102 | B1 | 6/2002 | Arnold | |
| 2008/0087509 | A1 * | 4/2008 | Kalbeck et al. | 188/156 |

FOREIGN PATENT DOCUMENTS

| | | |
|---|---|---|
| DE | 10 2005 046300 | 4/2006 |
| DE | 10 2007 030780 | 1/2009 |
| EP | 1 445 162 | 8/2004 |
| JP | 63-93659 | 4/1988 |

* cited by examiner

*Primary Examiner* — Mary Cheung
*Assistant Examiner* — Anne Mazzara
(74) *Attorney, Agent, or Firm* — Kenyon & Kenyon LLP

(57) ABSTRACT

A method for securing an electrically operated parking brake, characterized by the following steps: monitoring an operating variable which is relevant for the proper functioning of the parking brake; ascertaining/determining whether the operating variable exceeds a predefined threshold value; and prompting the driver to carry out a certain action as a function of the value of the operating variable, the action including the engagement of the gear or the operation of the foot service brake. Also described is a control unit for carrying out the described method.

11 Claims, 2 Drawing Sheets

METHOD FOR SECURING AN ELECTRICALLY OPERATED PARKING BRAKE

FIELD OF THE INVENTION

The present invention relates to a method for securing an electrically operated parking brake and to an appropriately programmed control unit.

BACKGROUND INFORMATION

Modern vehicles are increasingly equipped with electrically operated parking brakes which are also referred to as automatic parking brakes (APB). Systems of this type usually include an operating element, e.g., a push-button, using which the parking brake may be locked and/or released. A control unit, which is connected to the operating element, recognizes the intention of using the parking brake and activates an actuator accordingly, such as a hydraulic pump or an electric motor, to lock or release the parking brake.

For this purpose, known parking brakes include a mechanical locking device which locks the brake calipers in the engaged position. The locking device is usually also operated by hydraulic or pneumatic pressure or is motor-driven. The respective elements, e.g., a hydraulic pump or an electric motor, are accordingly activated by a control unit.

Automatic parking brakes offer increased comfort and safety to the driver, since they are operatable simply by pushing a button. As soon as the parking brake has been successfully locked, the proper state of the parking brake is displayed to the driver with the aid of a function lamp. The lighting up of the function lamp does, however, not mean that the parking brake is in fact capable of holding the vehicle. Under unfavorable circumstances, e.g., when the vehicle is parked at a great downhill grade or when the brake disks are very hot, the clamping force of the parking brake may not be sufficient to reliably hold the vehicle. In the worst case, the vehicle is at risk of starting to roll.

SUMMARY OF THE INVENTION

It is thus an object of the exemplary embodiments and/or exemplary methods of the present invention to secure an electrically operated parking brake in such a way that it holds the vehicle at a standstill even under unfavorable circumstances.

This object may be achieved according to the exemplary embodiments and/or exemplary methods of the present invention by the features described herein. Further embodiments of the present invention are the subject matter of the further descriptions herein.

One aspect of the exemplary embodiments and/or exemplary methods of the present invention is that an operating variable which is relevant for the proper functioning of the parking brake is monitored and it is ascertained whether the operating variable exceeds a predefined threshold value. A proper functioning of the parking brake is understood as the capability of the parking brake to hold the vehicle at a standstill. A relevant operating variable is a variable which may interfere with the capability of the parking brake to hold the vehicle at a standstill, for example, the road gradient or the brake temperature. If the monitored operating variable exceeds a threshold value, the driver is prompted to carry out a certain action, the action including the engagement of a gear or the operation of a foot service brake. By engaging the gear, the vehicle is additionally secured and prevented from rolling away even at fairly great gradients; by operating the foot service brake, the clamping action of the parking brake is supported, and thus a higher clamping force is achieved at the parking brake so that the vehicle is better secured against rolling away unintentionally.

Operating variables which may interfere with the function of the foot service brake are, in particular, the road gradient, a vehicle electrical system voltage, or a high brake temperature. According to the exemplary embodiments and/or exemplary methods of the present invention, at least one of the named variables may therefore be monitored. The brake temperature is understood as the temperature of any component of the brakes, e.g., in particular of the brake actuator.

The exemplary embodiments and/or exemplary methods of the present invention may also be used in those parking brake systems which are capable of automatically providing a (for example, hydraulic) brake force to support the parking brake. In these systems, e.g., ESP systems, the present invention represents a level of backup for the event that the system is not able to provide pressure support due to a defect of the pump motor, a pump element, or a valve. In this case, the system is monitored for a defect, and the driver is prompted to carry out an action if a defect has been recognized.

The threshold value for the monitored operating variable may be at the border of a value range in which the parking brake normally works properly. In the case of the road gradient, the threshold value may be 10%, for example.

The driver may be prompted to engage the first gear or the reverse gear, since the particular gear has additional braking torque to support the parking brake.

The driver may be prompted to carry out one or multiple actions. When prompted to carry out multiple actions, the driver may carry them out simultaneously or sequentially.

The driver may be prompted via a visual display, e.g., a display or a control light, via an acoustic signal, e.g., an alert, and/or via a tactile or haptic signal, e.g., the vibrating of the steering wheel.

According to one specific embodiment of the present invention, multiple threshold values may be predefined, the driver being prompted to carry out different actions as a function of the particular exceeded threshold value.

In one specific embodiment of the present invention, the driver is prompted to engage a gear or to operate the foot service brake if the value of the operating variable is between a first and a second threshold value. In the case that the value of the operating variable exceeds the first and the second threshold values, the driver may be prompted to carry out two actions, for example, to engage a gear and to operate the foot service brake.

When monitoring the road gradient, a first threshold value may be at an approximately 10% grade, and a second threshold value at an approximately 20% grade. Conventional parking brakes usually work without any problems with gradients below approximately 10%.

When monitoring the vehicle electrical system voltage, a first threshold value may be between 8 V and 10 V, in particular at approximately 9 V, and a second threshold value between approximately 6 V and 8 V, in particular at approximately 7 V. Conventional parking brakes usually work without any problems between 11 V and 14 V.

When monitoring the brake temperature, a first threshold value may be between approximately 60° C. and 80° C., in particular approximately at 70° C., and a second threshold value between approximately 80° C. and 120° C., in particular at approximately 100° C. The temperature values refer to the temperature of the actuator, e.g., of an electric motor situated on the caliper unit. The temperature of the brake disk is usually well above this temperature range. The value range of the actuator temperature for a properly functioning parking brake is typically between −20° C. and 60° C.

In the sense of the exemplary embodiments and/or exemplary methods of the present invention, exceeding a threshold value is understood to mean any type of the monitored variable leaving the value range delimited by the threshold value, i.e., also exceeding a threshold value in the direction of lower values.

The exemplary embodiments and/or exemplary methods of the present invention further include a control unit having means to carry out the previously described method.

The exemplary embodiments and/or exemplary methods of the present invention are explained in the following in greater detail on the basis of the attached drawings as an example; the features, individually and in every combination, advantageously refine the subject matters defined herein and the embodiments previously described.

DETAILED DESCRIPTION

Figure 1:
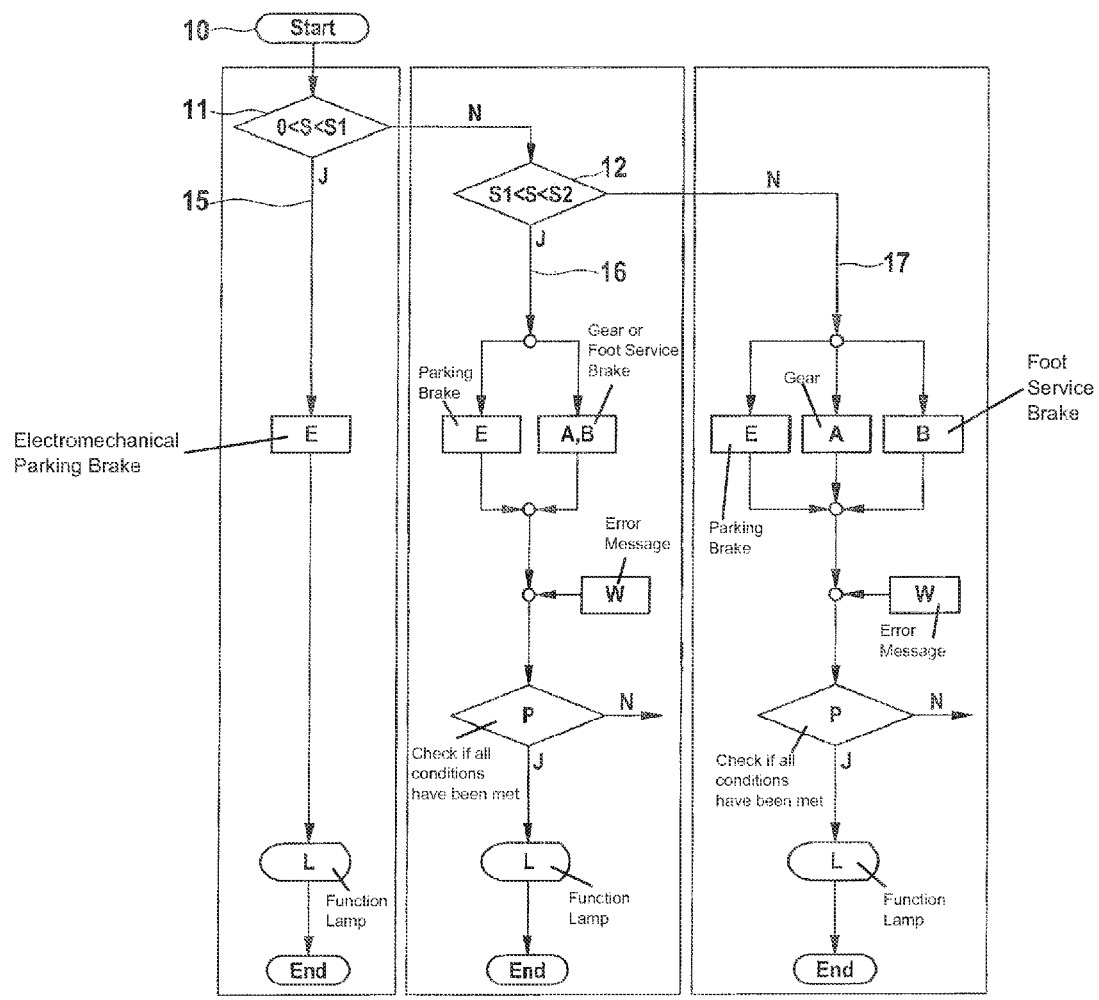
FIG. 1 shows flow charts for securing the locking state of an electrically operated parking brake on the basis of the road gradient.

FIG. 1 shows a flow chart for securing an electrically operated parking brake, taking into account the road gradient. With the aid of the method, it may be ensured that the parking brake of the vehicle holds the vehicle reliably at a standstill even at great gradients of more than 10%.

In a first step 10, the electrically operated parking brake is operated by the driver, by pushing a button, for example. Subsequently, it is checked in step 11 whether the road gradient is smaller than a threshold value S1, e.g., 10%. If this is the case (case J), the subsequent steps are carried out along path 15, without the driver being prompted to carry out an action. The electromechanical parking brake is initially activated (E) and the proper state is displayed to the driver, with the aid of a function lamp (L), for example, upon successful locking of the parking brake. If the query from step 11 is negative (case N), the query from step 12 is carried out.

If the value of the road gradient is between first threshold value S1 and second threshold value S2 (S2>S1) (case J), the method follows path 16. In this case, the parking brake is activated (E) and the driver is prompted to either engage a gear or to operate the foot service brake (B o). Subsequently, it is checked (P) whether die activation and the particular response by the driver have taken place. If one or both conditions has/have not been met (case N), the driver receives an error message or warning (W). In the case that both conditions have been met (case J), the proper locking state of the parking brake is signaled to the driver with the aid of a function lamp (step L).

If the query from step 12 is negative (case N), the method proceeds along path 17. In this case, the road gradient is also greater than second threshold value S2, e.g., 20%. The parking brake is then reactivated (E) and the driver is prompted to engage a gear (A) and to also operate the foot service brake (B). It is checked in step P whether all preceding conditions have been met. If only one of the stated conditions has not been met (case N), an error message (W) is signaled to the driver. In the case that all conditions have been met (case J), the proper locking state of the parking brake is signaled to the driver with the aid of a function lamp (L).

Figure 2:
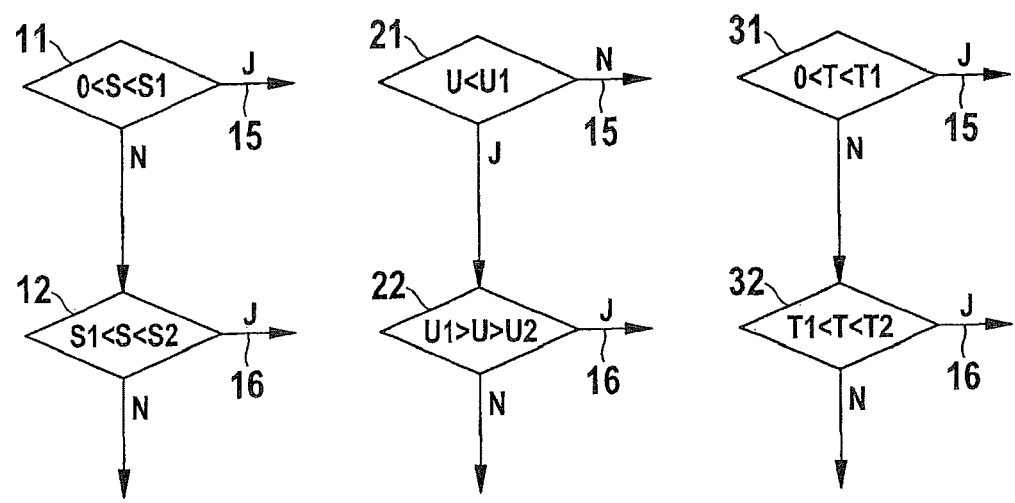
FIG. 2 shows essential method steps for securing the locking state of an electrically operated parking brake for the road gradient, the vehicle electrical system voltage, and the brake temperature.

FIG. 2 shows three flow charts, queries 11, 12, and 13 from FIG. 1 being illustrated in an abbreviated form in the first chart.

The middle flow chart from FIG. 2 shows corresponding queries with reference to vehicle electrical system voltage U instead of road gradient S. In step 21, it is checked in this context whether the value of the vehicle electrical system voltage is smaller than a threshold value U1. If no (case N), the method is continued on path 15 (see FIG. 1). If yes (case J), it is checked (step 22) whether the value of the vehicle electrical system voltage is between threshold value U1 and threshold value U2 (U2<U1). If yes (case J), the method is continued on path 16 (see FIG. 1). If no (case N), the method is continued on path 17 (see FIG. 1).

Steps 31, 32, and 33 of the third flow chart in FIG. 2 are carried out similarly, T1 being a first threshold value and T2 being a second threshold value for brake temperature T (T2>T1).

What is claimed is:

1. A method for securing an electrically operated parking brake, the method comprising:
    monitoring, by a control unit, including a processor, an operating variable which is relevant for the proper functioning of the parking brake;
    determining, by the control unit, whether the operating variable exceeds a predefined threshold value; and
    prompting, by the control unit, the driver to perform a certain action as a function of the value of the operating variable, the certain action including the engagement of the gear or the operation of the foot service brake, wherein the prompting of the driver to perform the certain action occurs one of (i) simultaneously with an activation of the parking brake or (ii) after the activation of the parking brake.

2. The method of claim 1, wherein multiple threshold values are predefined and the driver is prompted to carry out different actions, depending on which threshold value is exceeded.

3. The method of claim 2, wherein the driver is prompted to engage the gear or to operate the foot service brake if the value of the operating variable exceeds the first and the second threshold values.

4. The method of claim 1, wherein the driver is prompted to engage the gear or to operate the foot service brake if the value of the operating variable is between a first and a second threshold value.

5. The method of claim 1, wherein the operating variable includes at least one of the road gradient, a vehicle electrical system voltage, and a brake temperature.

6. The method of claim 5, wherein when monitoring the brake temperature, a first threshold value is between approximately 60° C. and 80° C., and a second threshold value is between approximately 80° C. and 120° C.

7. The method of claim 5, wherein when monitoring the brake temperature, a first threshold value is at approximately 70° C., and a second threshold value is at approximately 100° C.

8. The method of claim 1, wherein when monitoring the road gradient, a first threshold value is at an approximately 10% grade, and a second threshold value is at an approximately 20% grade.

9. The method of claim 1, wherein when monitoring the vehicle electrical system voltage, a first threshold value is between approximately 8 V and 10 V, and a second threshold value is between approximately 6 V and 8 V.

10. The method of claim 1, wherein when monitoring the vehicle electrical system voltage, a first threshold value is at approximately 9 V, and a second threshold value is at approximately 7 V.

11. A control unit, including a processor, comprising:

a securing arrangement to secure an electrically operated parking brake, wherein the securing arrangement is configured to monitor an operating variable which is relevant for the proper functioning of the parking brake, determine whether the operating variable exceeds a predefined threshold value, and prompt the driver to carry out a certain action as a function of the value of the operating variable, the certain action including the engagement of the gear or the operation of the foot service brake, wherein the prompting of the driver to perform the certain action occurs one of (i) simultaneously with an activation of the parking brake or (ii) after the activation of the parking brake.

* * * * *